(12) United States Patent
Riman (10) Patent No.: US 10,875,815 B2
(45) Date of Patent: Dec. 29, 2020

(54) SUSTAINABLE SUPPLY OF RECIPE COMPONENTS FOR CERAMIC COMPOSITES PRODUCED BY HYDROTHERMAL LIQUID PHASE SINTERING

(71) Applicant: Rutgers, The State University of New Jersey, New Brunswick, NJ (US)

(72) Inventor: Richard E. Riman, Belle Mead, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 640 days.

(21) Appl. No.: 15/541,055

(22) PCT Filed: Jan. 5, 2016

(86) PCT No.: PCT/US2016/012203
§ 371 (c)(1),
(2) Date: Jun. 30, 2017

(87) PCT Pub. No.: WO2016/112022
PCT Pub. Date: Jul. 14, 2016

(65) Prior Publication Data
US 2018/0002240 A1 Jan. 4, 2018

Related U.S. Application Data

(60) Provisional application No. 62/099,988, filed on Jan. 5, 2015.

(51) Int. Cl.
*C04B 40/00* (2006.01)
*C04B 40/02* (2006.01)
(Continued)

(52) U.S. Cl.
CPC ...... *C04B 40/0231* (2013.01); *B01D 53/1425* (2013.01); *B01D 53/1475* (2013.01);
(Continued)

(58) Field of Classification Search
CPC ............... C04B 40/0231; B01D 53/62; B01D 53/1493; B01D 53/1425; B01D 53/1475;
(Continued)

(56) References Cited

U.S. PATENT DOCUMENTS 3,632,624 A 1/1972 Andreson et al.
3,853,498 A * 12/1974 Bailie ............... C10B 49/22
48/209

(Continued)

*Primary Examiner* — Noah S Wiese
(74) *Attorney, Agent, or Firm* — Fox Rothschild LLP (57) ABSTRACT

A method for preparing a ceramic composition while simultaneously reducing the quantity of carbon dioxide from municipal solid waste that would discharge into environment includes decomposing the municipal solid waste to generate a carbon dioxide-water vapor mixture, providing a matrix, the matrix containing a reactant; and contacting the carbon dioxide-water vapor mixture with the matrix to promote a reaction between the carbon dioxide of the carbon dioxide-water vapor mixture and the reactant of the matrix. The reaction forms a product, thereby producing the ceramic composition.

23 Claims, 7 Drawing Sheets

(51) Int. Cl.
    *B01D 53/14*     (2006.01)
    *B01D 53/62*     (2006.01)
    *C01B 32/60*     (2017.01)
    *C01B 32/50*     (2017.01)
    *C01F 5/24*     (2006.01)
    *C01F 11/18*     (2006.01)
    *C04B 28/30*     (2006.01)

(52) U.S. Cl.
CPC ......... *B01D 53/1493* (2013.01); *B01D 53/62* (2013.01); *C01B 32/50* (2017.08); *C01B 32/60* (2017.08); *C01F 5/24* (2013.01); *C01F 11/18* (2013.01); *C04B 28/30* (2013.01); *B01D 2251/30* (2013.01); *B01D 2251/402* (2013.01); *B01D 2251/404* (2013.01); *B01D 2252/20405* (2013.01); *B01D 2252/20421* (2013.01); *B01D 2252/20484* (2013.01); *B01D 2257/504* (2013.01); *B01D 2258/0291* (2013.01); *Y02C 20/40* (2020.08); *Y02P 20/151* (2015.11)

(58) Field of Classification Search
CPC . B01D 2258/0291; C01B 32/60; C01B 32/50; C01F 11/18; Y02C 10/06
See application file for complete search history.

(56) References Cited

U.S. PATENT DOCUMENTS

| | | |
|---|---|---|
| 5,632,798 A | 5/1997 | Funk et al. |
| 2009/0143211 A1 | 6/2009 | Riman et al. |
| 2011/0158873 A1* | 6/2011 | Riman ............... B01D 53/1425 423/228 |
| 2014/0093659 A1* | 4/2014 | Riman ................... C04B 35/64 427/595 |

* cited by examiner

SUSTAINABLE SUPPLY OF RECIPE COMPONENTS FOR CERAMIC COMPOSITES PRODUCED BY HYDROTHERMAL LIQUID PHASE SINTERING

CROSS-REFERENCE TO RELATED APPLICATIONS

This application claims the benefit of U.S. Provisional Application Ser. No. 62/099,988, filed Jan. 5, 2015, which is hereby incorporated by reference.

BACKGROUND

Municipal Solid Waste (MSW) disposal is a challenge faced by many municipalities. Even in a small community of 1,000 people, nearly 500 tons of MSW is created each year. MSW is either buried in landfills or burned. MSW in landfills decomposes and generates methane, a very potent greenhouse gas that is 25-times more potent than $CO_2$. Burning MSW generates significant carbon emissions. The cost of disposal continues to increase, along with the energy required to collect and dispose of it. There is a need to develop innovative solutions to reduce the emissions from solid waste.

Hydrothermal Liquid Phase Sintering (HLPS) (also known as Hydrothermal Liquid Phase Densification) is a promising replacement for Portland cement technology because it produces hydrate-free cement (HFC). Unfortunately, the solidification process requires the delivery of liquid water and gaseous $CO_2$. This can be troublesome for several reasons. First, there are remote regions where the supply of $CO_2$ or water could be scarce or costly. Water sources are scarce in arid regions such as deserts or regions of drought and the energy and cost to deliver large supplies of water to the materials manufacturing site could be prohibitively large. Second, the amount of $CO_2$ required in systems where a high degree of carbonation is required is extensive. There are no extensive networks of $CO_2$ gas in any part of the world that are comparable to those used to deliver methane. Thus, in the interest of making materials that react with $CO_2$ available throughout the world for applications such as ceramic compositions, it is important to find raw materials already in network that can sustainably supply $CO_2$ and water at low cost.

SUMMARY OF THE INVENTION

The invention provides a solution to the above problems by providing a sustainable supply of components, such as $CO_2$ and water, for preparing cement or ceramic compositions and simultaneously reducing significant green house emissions.

A method for preparing a ceramic composition while simultaneously reducing the quantity of carbon dioxide from municipal solid waste that would discharge into the environment includes decomposing the municipal solid waste to generate a carbon dioxide-water vapor mixture or a gas-water vapor mixture containing carbon dioxide, providing a matrix, the matrix containing a reactant, and contacting the carbon dioxide with the matrix to promote a reaction between the carbon dioxide and the reactant of the matrix. The reaction forms a product, thereby producing the ceramic composition. The carbon dioxide-containing mixture may be delivered directly to the matrix. Alternatively, the carbon dioxide-water vapor mixture is placed in contact with a gas absorber to form a carbon dioxide-gas absorber mixture, which is then delivered to the matrix.

In some embodiments, the method can include providing a gas absorber, contacting the carbon dioxide-water vapor mixture with the gas absorber to form a carbon dioxide-gas absorber mixture, and contacting the carbon dioxide-gas absorber mixture with the matrix to promote the reaction between the carbon dioxide and the reactant.

The gas absorber can include a nitrogen-containing compound. The nitrogen-containing compound can be ammonia, alkanolamines, polyamines of a mixed or single type, cyclic and aromatic amines, aminoacids, sterically free and hindered amines, monoethanolamine (MEA), diethanolamine (DEA), ethyldiethanolamine, methyldiethanolamine (MDEA), 2-amino-2-methyl-1-propanol (AMP), 3-piperidino-1,2-propanediol, 3-quinuclidinol, 2-piperidineethanol, 2-piperidinemethanol, N,N-dimethylethanolamine, 2-amino-2 methyl-1,3 propanediol, diisopropanolamine, piperazine, or a mixture thereof.

The nitrogen-containing compound and the carbon dioxide can form an adduct in the carbon dioxide-gas absorber mixture. The matrix includes a metal oxide, a metal hydroxide, a metal halide, a mixed metal oxide, a metal sulfate, a metal silicate, or a metal hydroxyapatite. The metal is Group IIa metal, Group IIb metal, Group IIIb metal, Group IVb metal, Group Vb metal, transition metal, lanthanide metal, actinide metal, or a mixture thereof.

The gas absorber may further contain an organic or inorganic base.

The municipal solid waste can be decomposed by methods such as incineration, micro auto gasification, hydrothermal destruction, or supercritical water oxidation.

The matrix can be prepared from ash generated by decomposing the municipal solid waste.

In some embodiments of the method, the carbon dioxide-water vapor mixture or the gas-water vapor mixture containing carbon dioxide is delivered to the matrix which contains a reactant. The carbon dioxide in the mixture reacts with the reactant of the matrix to provide the desired composition.

The method can further include providing a deliquescent solid, the deliquescent solid being premixed with the matrix, and contacting the carbon dioxide-water vapor mixture with the deliquescent solid in the matrix to form a deliquescent liquid.

The deliquescent solid can include lithium nitrate, magnesium nitrate, lithium chloride, calcium chloride, sodium chloride, magnesium chloride, zinc chloride, ammonium carbonate, lithium carbonate, sodium carbonate, potassium carbonate, potassium phosphate, carnallite, ferric ammonium citrate, lithium hydroxide, potassium hydroxide, sodium hydroxide, a mixture thereof, or other salts that are hygroscopic.

Also provided herein is a system for preparing a ceramic containing composition while simultaneously reducing the quantity of carbon dioxide from municipal solid waste that would discharge into the environment includes a municipal solid waste treatment unit that generates a carbon dioxide-water vapor mixture or a gas-water vapor mixture containing carbon dioxide from the municipal solid waste, a ceramic composition unit that prepares the ceramic composition from the carbon dioxide-water vapor mixture or the gas-water vapor mixture containing carbon dioxide and a matrix containing a reactant, and a delivery path that delivers the carbon dioxide-containing mixture from the municipal solid waste treatment unit to the ceramic composition unit.

The delivery path can include a gas absorber. The gas absorber can be water, ammonia, alkanolamines, polyamines of a mixed or single type, cyclic and aromatic amines, aminoacids, sterically free and hindered amines, monoethanolamine (MEA), diethanolamine (DEA), ethyldiethanolamine, methyldiethanolamine (MDEA), 2-amino-2-methyl-1-propanol (AMP), 3-piperidino-1,2-propanediol, 3-quinuclidinol, 2-piperidineethanol, 2-piperidinemethanol, N,N-dimethylethanolamine, 2-amino-2 methyl-1,3 propanediol, diisopropanolamine, piperazine, or a mixture thereof.

The delivery path and/or the matrix can include a deliquescent solid. The deliquescent solid can include lithium nitrate, magnesium nitrate, lithium chloride, calcium chloride, sodium chloride, magnesium chloride, zinc chloride, ammonium carbonate, lithium carbonate, sodium carbonate, potassium carbonate, potassium phosphate, carnallite, ferric ammonium citrate, lithium hydroxide, potassium hydroxide, sodium hydroxide, a mixture thereof, or other salts that are hygroscopic.

The deliquescent solid can be premixed with the matrix. The matrix can be prepared from ash generated by decomposing the municipal solid waste in the municipal solid waste treatment unit.

It is to be understood that both the foregoing general description and the following detailed description are exemplary and explanatory only and are not restrictive of the invention as claimed.

BRIEF DESCRIPTION OF THE DRAWINGS

The embodiments of the invention will be described with reference to the accompanying drawings, in which.

DETAILED DESCRIPTION OF THE INVENTION

Various embodiments of the present invention provide methods for producing a cement or ceramic composition utilizing decomposition products from sources such as municipal solid waste. Advantages include the cost-efficiency of the methods and the reduction of carbon-dioxide into the atmosphere.

Throughout this patent document, various publications are referenced. The disclosures of these publications in their entireties are hereby incorporated by reference into this application in order to more fully describe the state of the art to which the disclosed matter pertains. While the following text may reference or exemplify specific elements of a composition or a method of producing the composition, it is not intended to limit the scope of the invention to such particular reference or examples. Various modifications may be made by those skilled in the art, in view of practical and economic considerations, such as the temperature and pressure of the reaction conditions and the characteristics of the reactant in the matrix.

The articles "a" and "an" as used herein refers to "one or more" or "at least one," unless otherwise indicated. For example, reference to any element or compound of the present invention by the indefinite article "a" or "an" does not exclude the possibility that more than one element or compound is present.

The term "about" as used herein refers to the referenced numeric indication plus or minus 10% of that referenced numeric indication.

The term "Municipal Solid Waste" (MSW) as used herein is defined as waste materials generated by homes or businesses, including, for example, food, kitchen waste, green waste, paper waste, glass, bottles, cans, metals, plastics, fabrics, clothes, batteries, tires, building debris, construction and demolition waste, dirt, rocks, debris, electronic appliances, computer equipment, paints, chemicals, light bulbs and fluorescent lights, fertilizers, and medical waste. As defined in the invention, municipal solid waste also includes sewage sludge, which contains undigested food residues, mucus, bacteria, urea, chloride, sodium ions, potassium ions, creatinine, other dissolved ions, inorganic and organic compounds and water.

Municipal solid waste in its various forms is a more compact form of $CO_2$ and water than the pure substances of water and carbon dioxide. For example, the carbon content of municipal solid waste in 1 large dumpster is equivalent to at least 15,000 pounds of carbon dioxide and 700 gallons of water. Unlike pure water and $CO_2$, neither refrigeration nor preservatives are needed to store municipal solid waste over the long term. Furthermore, minimal transportation is required to bring municipal solid waste to a decomposition site. The invention identifies specific processes for producing $CO_2$, water, salt and other useful species (recipe components) that are derived from the processing of municipal solid waste.

An aspect of the invention provides a method for preparing a cement or ceramic composition while simultaneously reducing the quantity of carbon dioxide from municipal solid waste that would discharge to environment. Key steps of the method include (a) de-composing the municipal solid waste to generate a gas-water vapor mixture comprising carbon dioxide; (b) providing a matrix comprising a reactant; and (c) contacting said carbon dioxide with said matrix to promote a reaction between said carbon dioxide and said reactant of the matrix.

The means to decompose municipal solid waste are numerous. While incineration has long been practiced, the ash generated by carbonization has outlawed this technology extensively in the United States while still prevalent in other countries. Other processes, such as the Micro Auto Gasification System (MAGS) and the Tactical Garbage to Energy Refinery (TGER), are technologies that can reduce the ash residue by a factor of ten because the processes are capable of volatilizing a large fraction of the waste as CO and $H_2$ (instead of carbon and hydrocarbons), also known as syngas, which can be reacted with air to form $CO_2$ and water. Both incineration and MAGS generate a significant amount of energy, enabling the heating of reactors at temperatures on the order of 1000° C., which is suitable for synthesis of compounds, such as calcium or magnesium silicate to use as a cement for construction materials as well as functional material.

The volume of carbon dioxide and water is sufficient to generate a significant amount of construction materials. For example, the municipal solid waste generated by 1,000 troops alone in a forward operating base can generate enough $CO_2$ to supply about 1000 building blocks typically used in construction (8×8×16 inches) per day. Over 135 million tons of municipal solid waste entered the United States' landfills in 2010, whereas only 114 million tons were recycled, composted, or combusted for energy production.

Other methods of municipal solid waste decomposition include hydrothermal destruction and supercritical water oxidation. Hydrothermal destruction (aka, hydrothermal oxidation) takes place in liquid water at temperatures below the critical point of water corresponding to a temperature of 374° C. and a pressure of 22 MPa (218 atm). Supercritical water oxidation (SWO) is utilized at temperatures and pressures above this critical point. Both technologies are currently utilized on a worldwide scale.

All these systems are currently used as a means to destroy waste because they typically generate no ash residue, but not to produce $CO_2$, water, and salt products that have value for the production of building and infrastructure materials. In these methods, all the carbon is converted to $CO_2$ so that the only solid residues are inorganic materials, such as metals and ceramic oxides.

All these municipal solid waste decomposition methods as well as others not discussed here can be applied in the invention. The municipal solid waste decomposition method for the invention is not limited to the methods described herein.

The gas mixture (including $CO_2$, water vapor, salts, and other components) generated from the municipal solid waste decomposition can then be delivered to a facility that manufactures ceramic compositions. Preferably, the ceramic composition facility is close to the municipal solid waste decomposition facility, for example, the facilities are co-located at the same plant. The municipal solid waste decomposition facility and the ceramic composition facility need not be at the same location as long as the carbon dioxide and water generated can be delivered from the municipal solid waste decomposition facility to the ceramic composition facility conveniently and efficiently via a delivery path.

Figure 1:
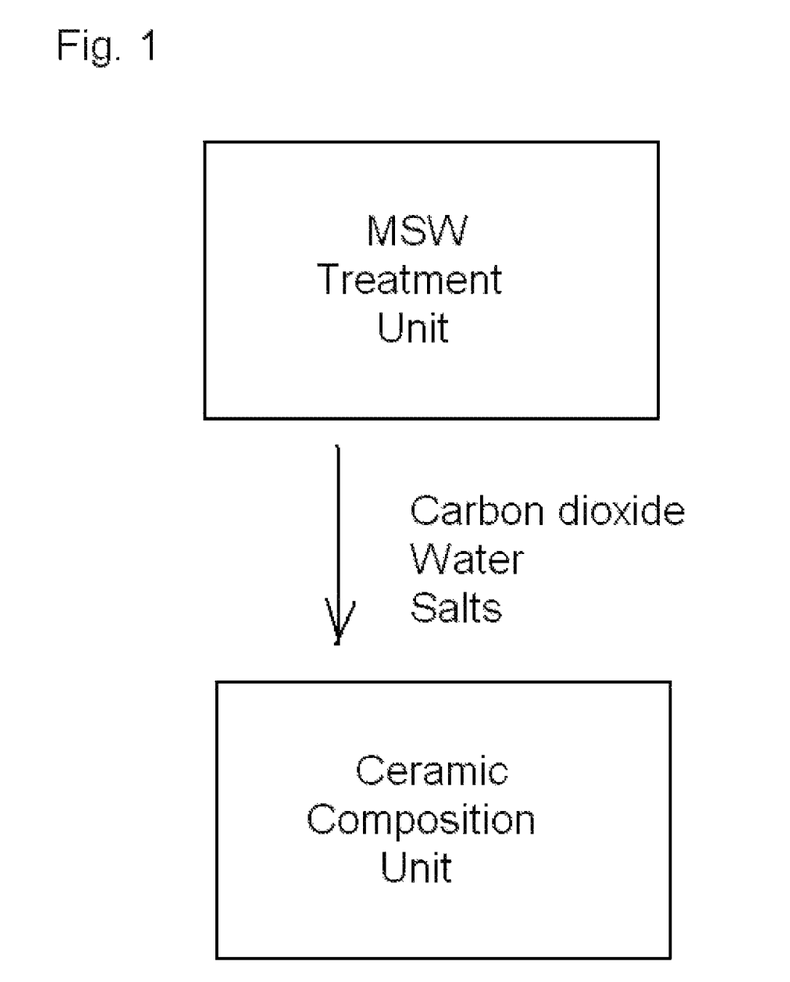
FIG. 1 is a diagrammatic representation of a system for preparing a ceramic composition while simultaneously reducing the quantity of carbon dioxide from municipal solid waste that would discharge into environment.

FIG. 1 is a diagrammatic representation of a system for preparing a ceramic composition while simultaneously reducing the quantity of carbon dioxide from municipal solid waste that would discharge into the environment. The system includes a municipal solid waste treatment unit, a ceramic composition unit, and a delivery path. The municipal solid waste treatment unit generates a carbon dioxide-water vapor mixture from the municipal solid waste. The delivery path delivers the carbon dioxide and water of the carbon dioxide-water vapor mixture from the municipal solid waste treatment unit to the ceramic composition unit. The delivery path may include a gas absorber or a deliquescent solid, which is discussed in detail later. The ceramic composition unit prepares a ceramic composition from the carbon dioxide-water vapor mixture and a matrix containing a reactant.

Alternatively, the water in the carbon dioxide-water vapor mixture can be recovered by cooling the carbon dioxide-water vapor mixture below its dew point, thus initiating water condensation. The water collected can be valuable in areas where supply of water is scarce or costly. After the cooling and condensation process, the carbon dioxide-water vapor mixture can be supplied to the ceramic composition unit.

The carbon dioxide-water vapor mixture may also include salts and other components. The salts can be collected and used for various applications.

The delivery path may include a gas absorber. The gas absorber can be any type of molecule that absorbs gas. The gas absorber can be water. The gas absorber can be premixed with a matrix used in a Hydrothermal Liquid Phase Sintering process (also known as Hydrothermal Liquid Phase Densification). The gas absorber can be a nitrogen-containing compound, e.g., an amine-based gas absorber. The amine can be any type of amine known in the art. The amines can, for example, comprise a primary amine, a secondary amine, a tertiary amine, a quaternary or combinations thereof. It can also comprise ammonia; alkanolamines; polyamines of a mixed or single type; cyclic and aromatic amines; amino-acids; and sterically free and hindered amines. The amine can also comprise monoethanolamine (MEA), diethanolamine (DEA), ethyldiethanolamine, methyldiethanolamine (MDEA), 2-amino-2-methyl-1-propanol (AMP), 3-piperidino-1,2-propanediol, 3-quinuclidinol, 2-piperidineethanol, 2-piperidinemethanol, N,N-dimethylethanolamine, 2-amino-2methyl-1,3 propanediol, diisopropanolamine, piperazine, or combinations thereof. Additional materials can also be found in Puxty et al., *Environ. Sci. Technol.*, 2009, 43, 6327-6433. Alternatively, the amine can be a proprietary amine, such as Flexsorb, KS-1, KS-2, KS-3, or combinations thereof; a description of these amines can be found in, for example, Gupta et al., $CO_2$ capture technologies and opportunities in Canada. 1$^{st}$ Canadian CC&S Technology Roadmap Workshop, 18-19, Sep. 2003, Calgary, Alberta, Canada.

For instance, the gas absorber can comprise ammonia, monoethanolamine (MEA), diethanolamine (DEA), methyldiethanolamine (MDEA), 2-amino-2-methyl-1-propanol (AMP), or combinations thereof. In certain instances, surfactants (e.g., polysiloxanes, polyethylene glycols, and alkyldimethylamine oxides and the like) may be added to the infiltrating medium.

The gas absorber can further comprise a base, such as a basic solution, such as an organic base and/or an inorganic base. An organic base can be any organic material which can be, for example, an amine-based gas absorber, such as MEA. It can also be a polymer that acts as a Lewis base. For example, an organic base can be a pyridine. The inorganic gas absorber can comprise a material comprising a halide element.

The gas absorber can further comprise water-soluble salts, such as metal salts (i.e., metal in ion forms). The cation of such salts, for example, may come from the following metals: beryllium, magnesium, calcium, strontium, barium, scandium, titanium, vanadium, chromium, manganese, iron, cobalt, nickel, copper zinc, aluminum, gallium, germanium, tin, antimony, indium, cadmium, silver, lead, rhodium, ruthenium, technetium, molybdenum, neodymium, zirconium, ytterbium, lanthanum hafnium, tantalum, tungsten, rhenium, osmium, iridium, platinum, gold, mercury, thallium, palladium, cations of the lanthanide series metals, cations of the actinide series metals, or a mixture thereof. Alternatively, the cation can be ammonium.

In general, the anion of the salts in the gas absorber may come, for example, from the following groups: hydroxides, nitrates, chlorides, acetates, formates, propionates, phenylacetates, benzoates, hydroxybenzoates, aminobenzoates, methoxybenzoates, nitrobenzoates, sulfates, fluorides, bromides, iodides, carbonates, oxalate, phosphate, citrate, and silicates, or combinations thereof.

The carbon dioxide in the carbon dioxide-water vapor mixture can form an adduct with the gas absorber. For example, the carbon dioxide can form a carbon dioxide-amine adduct with a gas absorber containing amine. The absorption of the carbon dioxide by the gas absorber thus can produce an adduct, which can further react with a matrix in a Hydrothermal Liquid Phase Sintering process.

Alternatively, the adduct needs not be formed. For example, the carbon dioxide is dissolved in the gas absorber, and the carbon dioxide in the gas absorber is then supplied to the Hydrothermal Liquid Phase Sintering process. Herein, the carbon dioxide-gas absorber adduct and the gas absorber with dissolved carbon dioxide are collectively called "carbon dioxide-gas absorber mixture."

The carbon dioxide-gas absorber mixture is then supplied to a Hydrothermal Liquid Phase Sintering process. A description of the HLPS process can be found in, for example, U.S. application Ser. No. 12/271,566 (Pub. No. 2009/0143211) and Ser. No. 12/271,513 (Pub. No. 2009/0142578) to Riman et al., the disclosures of each of which is incorporated in its entirety by reference herein. HLPS can be used to make monolithic dense bodies, e.g., ceramic compositions. Such process can be integrated into a municipal solid waste decomposition facility to sequester the carbon dioxide generated by the plant.

In an HLPS process, a "green" or partially sintered, porous, solid matrix having contiguous interstitial pores can be transformed into a sintered ceramic by the action of a liquid phase infiltrating medium. HLPS can be carried out under relatively mild conditions, frequently not exceeding the temperature and pressure encountered in a functioning autoclave. HLPS can be performed in a wide range of temperatures and pressures. For example, in some embodiments, the HLPS conditions can include temperatures less than about 2000° C., such as less than about 1000° C., such as less than about 500° C., such as less than about 200° C., such as less than about 100° C., such as less than about 40° C., such as room temperature. The reaction gauge pressure can be less than about 100000 psi, such as less than 70000 psi, such as less than about 50000 psi, such as less than about 10000 psi, such as less than about 5000 psi, such as less than about 2000 psi, such as less than about 1000 psi, such as less than about 500 psi, such as less than about 100 psi, such as less than about 50 psi, such as less than about 10 psi. In one embodiment, the hydrothermal sintering process can be carried out at a temperature in the range of about 80° C. to about 180° C. and at a pressure in the range of about 1 to about 3 atmospheres. (1 atmosphere is about 15 psi.) Note that in this embodiment, because the pressure refers to gauge pressure, the real pressure can be calculated by adding the gauge pressure to 1 atmosphere. Any starting matrix material that is capable of undergoing a hydrothermal reaction with an infiltrating species to produce a different substance may be used to produce the hydrothermally sintered product. Hence, a wide variety of starting materials may be selected, depending on the contemplated end use. The materials can be formed into a solid matrix having the desired shape and size and, subsequently, subjected to the steps of the method described herein for transformation into the sintered finished product. The solid matrix can be a porous solid matrix or a substantially dense solid matrix. The matrix is described in more detail below.

Hydrothermal reaction described herein can include transformations taking place in aqueous or nonaqueous liquid media. In one embodiment of the invention, the liquid phase infiltrating medium may be the carbon dioxide-gas absorber mixture described above.

Furthermore, such transformations may include the dissolution and re-precipitation of the same chemical species, the dissolution of one chemical species and its combination with a second chemical species to form a composite material in which the initial chemical species remain distinct, or the reaction of one chemical species with a second chemical species to produce a new chemical moiety that is distinct from the starting species. The hydrothermal sintering process thus can fill the interstitial spaces or voids in a porous solid matrix with a moiety by precipitation (or re-precipitation), ion addition, ion substitution, or a combination thereof. The moiety can comprise the same chemical species as that in the solid matrix, a composite resulting from the co-re-precipitation of two distinct chemical species, a new product resulting from a reaction between two chemical species, a re-precipitated material derived from an infiltrant species contained in the medium, or combinations thereof. In one embodiment, an HLPS process can be carried out under conditions in which at least a portion of the mass of the green porous solid matrix reacts with preselected infiltrant species present in the liquid phase infiltrating medium to produce a new product.

The matrix can be a variety of types of solids. It is desirable to have a matrix that can react with the infiltrating species in the liquid phase infiltrating medium, which will be described further below, to form a solid product. The product from the reaction can be insoluble, and it is desirable that no products other than the precipitation production form. Alternatively no additional products other than a liquid (such as water) is formed from this reaction. It is noted that upon additional processes, such as a further reactive chemistry process, the product can be used as a reactant to form further products, which then can be a solid or a liquid.

The matrix is a solid phase. The matrix, or alternatively, the starting material, can be in the form of a powder compact. A solid matrix can be in the form of a nonparticulate solid that contains pores. For example, the porosity of the solid matrix can be of any desirable value, such as over about 20%, such as over about 40%, such as over about 60%, such as over about 70%, such as over about 80%, such as over about 90%. The matrix may contain pores uniformly, randomly, or regionally. In one embodiment, a granulated powder can be used as a feedstock, which can be pressed into a shaped object. Many techniques of processing for the granulated powders, including spray drying, can be used, although some of these techniques can be costly. In one embodiment, the heat of the flue gas in the power plant can be used as a drying medium to form ceramic granules for fabricating the compact. The powder compact can also be part of a slurry. A ceramic slurry can be sprayed into a scrubbing tower. The slurry can comprise one or more powders and the powders can comprise a wide range of materials, such as ceramic. For example, the slurry can comprise a carbonate, such as calcium carbonate. The gas scrubbing can be performed before or after the spray drying. A monolithic porous solid, such as volcanic rock or thirsty glass (a borosilicate glass prepared by phase separation and acid washing) can be used as reactive matrix.

The slurry can be sprayed by any method that is generally known in the art, including, for example, by co-current or counter-current flows. Any scrubber suitable for a plant can be used. For example, scrubbers such as the commercial ones designed by Babcock and Wilcox (B&W) can be suitable for making and collecting the ceramic granules.

The matrix can comprise a reactant that contacts and/or reacts with the infiltrant species present in the liquid phase infiltrating medium. The reactant in the matrix can further comprise at least one of a gas separator and a gas sequester.

A porous solid matrix is derived from an oxide powder, such as a metal oxide powder and/or a ceramic. The powder may be amorphous or crystalline, preferably crystalline. Moreover, the metal oxide powder may have a wide range of particulate sizes ranging from a mean particle size of about 0.01 micron to about 100 microns, including, for example, about 0.02 to about 50 microns, such as about 0.04 to about 20 microns, such as about 0.08 to about 10 microns. In one embodiment, the powder has a mean particle size ranging from about 0.1 micron to about 5 microns.

The metal in the metal oxide can be chosen from an oxide of a Group IIa metal, Group IIb metal, Group IIIb metal, Group IVb metal, Group Vb metal, transition metal, lanthanide metal, actinide metal, or mixtures thereof. Preferably, the chosen metal oxide or the sintered finished product can have potential chemical, ceramic, magnetic, electronic, superconducting, mechanical, structural or even biological applications. The sintered finished product can have industrial or household utility. The finished product need not necessarily comprise the same material as the reactants. For example, a product substantially free of barium titanate, $BaTiO_3$, may be produced by reactants that comprise barium and/or titanium. However, in a different embodiment, the barium and/or titanium comprising reactant (or reactants) can act mostly as an intermediate reaction species, and thus may not necessarily be included in the final product.

The matrix can comprise at least one reactant that will react with the infiltrating species from the liquid phase infiltrating medium. The reactant can comprise at least one element, such as one, two, or three elements. The matrix can comprise at least one industrial waste. For example, the matrix can comprise red mud, coal, gypsum, wood, or garbage in general generated by a plant. The matrix can be a byproduct from a process carried out in a plant or can be one prepared specifically for the purpose of gas sequestration. For example, in one embodiment, the matrix is a solid matrix that is generated from a hot flue gas generated by the plant.

In the case of a solid matrix, the solid matrix can comprise a material that does not dissolve in a solution readily. In one embodiment, the porous solid matrix is derived from powder. The powder can be of any kind. For example, it can be a metal oxide powder. Examples of suitable a metal oxide can include the oxides of beryllium (e.g., $BeO$), magnesium (e.g., $MgO$), calcium (e.g., $CaO$, $CaO_2$), strontium (e.g., $SrO$), barium (e.g., $BaO$), scandium (e.g., $Sc_2O_3$), titanium (e.g., $TiO$, $TiO_2$, $Ti_2O_3$), aluminum (e.g., $Al_2O_3$), vanadium (e.g., $VO$, $V_2O_3$, $VO_2$, $V_2O_5$), chromium (e.g., $CrO$, $Cr_2O_3$, $CrO_3$, $CrO_2$), manganese (e.g., $MnO$, $Mn_2O_3$, $MnO_2$, $Mn_2O_7$), iron (e.g., $FeO$, $Fe_2O_3$), cobalt (e.g., $CoO$, $Co_2O_3$, $CO_3O_4$), nickel (e.g., $NiO$, $Ni_2O_3$), copper (e.g., $CuO$, $Cu_2O$), zinc (e.g., $ZnO$), gallium (e.g., $Ga_2O_3$, $Ga_2O$), germanium (e.g., $GeO$, $GeO_2$), tin (e.g., $SnO$, $SnO_2$), antimony (e.g., $Sb_2O_3$, $Sb_2O_5$), indium (e.g., $In_2O_3$), cadmium (e.g., $CdO$), silver (e.g., $Ag_2O$), bismuth (e.g., $Bi_2O_3$, $Bi_2O_5$, $Bi_2O_4$, $Bi_2O_3$, $BiO$), gold (e.g., $Au_2O_3$, $Au_2O$), zinc (e.g., $ZnO$), lead (e.g., $PbO$, $PbO_2$, $Pb_3O_4$, $Pb_2O_3$, $Pb_2O$), rhodium (e.g., $RhO_2$, $Rh_2O_3$), yttrium (e.g., $Y_2O_3$), ruthenium (e.g., $RuO_2$, $RuO_4$), technetium (e.g., $Ti_2O$, $Ti_2O_3$), molybdenum (e.g., $MoO_2$, $Mo_2O_5$, $Mo_2O_3$, $MoO_3$), neodymium (e.g., $Nd_2O_3$), zirconium (e.g., $ZrO_2$), lanthanum (e.g., $La_2O_3$), hafnium (e.g., $HfO_2$), tantalum (e.g., $TaO_2$, $Ta_2O_5$), tungsten (e.g., $WO_2$, $W_2O_5$), rhenium (e.g., $ReO_2$, $Re_2O_3$), osmium (e.g., $PdO$, $PdO_2$), iridium (e.g., $IrO_2$, $IR_2O_3$), platinum (e.g., $PtO$, $PtO_2$, $PtO_3$, $Pt_2O_3$, $Pt_3O_4$), mercury (e.g., $HgO$, $Hg_2O$), thallium (e.g., $TiO_2$, $Ti_2O_3$), palladium (e.g., $PdO$, $PdO_2$) the lathanide series oxides, the actinide series and the like. Moreover, depending upon the particular application involved, mixtures of metal oxides may also be used in making the preform.

The matrix can also comprise a hydroxide, such as a metal hydroxide. For example, it can comprise magnesium hydroxide (e.g., $Mg(OH)_2$), calcium hydroxide (e.g., $Ca(OH)_2$), strontium hydroxide (e.g., $Sr(OH)_2$), and barium hydroxide (e.g., $Ba(OH)_2$), chromium hydroxide (e.g., $Cr(OH)_2$), titanium hydroxide (e.g., $Ti(OH)_2$), zirconium hydroxide (e.g., $Zr(OH)_2$), manganese hydroxide (e.g., $Mn(OH)_2$), iron hydroxide (e.g., $Fe(OH)_2$), copper hydroxide (e.g., $Cu(OH)_2$), zinc hydroxide (e.g., $Zn(OH)_2$), aluminum hydroxide (e.g., $Al(OH)_3$), or a combination thereof.

The matrix can also comprise a fluoride, such as a metal fluoride. For example, it can comprise magnesium fluoride (e.g., $MgF_2$), calcium fluoride (e.g., $CaF_2$), strontium fluoride (e.g., $SrF_2$), and barium fluoride (e.g., $BaF_2$), chromium fluoride (e.g., $CrF_2$), titanium fluoride (e.g., $TiF_3$), zirconium fluoride (e.g., $ZrF_4$), manganese fluoride (e.g., $MnF_2$), iron fluoride (e.g., $FeF_2$), copper fluoride (e.g., $CuF_2$), nickel fluoride (e.g., $NiF_2$), zinc fluoride (e.g., $ZnF_2$), aluminum fluoride (e.g., $AlF_3$), or combinations thereof.

The matrix can also comprise a mixed metal oxide, such as a metal titanate. For example, it can comprise magnesium titanate (e.g., $MgTiO_3$), calcium titanate (e.g., $CaTiO_3$), strontium titanate (e.g., $SrTiO_3$), barium titanate (e.g., $BaTiO_3$), or combinations thereof.

The matrix can also comprise a sulfate, such as a metal sulfate. For example, it can comprise magnesium sulfate (e.g., $MgSO_4$), calcium sulfate (e.g., $CaSO_4$), strontium sulfate (e.g., $SrSO_4$), barium sulfate (e.g., $BaSO_4$), chromium sulfate (e.g., $Cr2(SO_4)_3$), titanium sulfate (e.g., $TiSO_4$, $Ti_2(SO_4)_3$), zirconium sulfate (e.g., $ZrSO_4$), manganese sulfate (e.g., $MnSO_4$), iron sulfate (e.g., $FeSO_4$), copper sulfate (e.g., $CuSO_4$), nickel sulfate (e.g., $NiSO_4$), zinc sulfate (e.g., $ZnSO_4$), aluminum sulfate (e.g., $Al_2(SO_4)_3$), or combinations thereof.

The matrix can also comprise a silicate or a hydrated silicate, such as a metal silicate or a metal hydrated silicates. For example, it can comprise lithium metasilicate, lithium orthosilicate, sodium metasilicate, beryllium silicate, calcium silicate, strontium orthosilicate, barium metasilicate, zirconium silicate, manganese metasilicate, iron silicate, cobalt orthsilicate, zinc orthosilicate, cadmium metasilicate, andalusite, silimanite, hyanite, kaolinite, magnesium silicate, magnesium hydrated silicate, calcium hydrated silicates, or combinations thereof. The matrix can also comprise minerals, such as mineral silicates, such as inosilicate (wollastonite), such as neosilicates (olivine), such as phyllosilicate (serpentine), such as tectosilicate (feldspar), or combinations thereof.

The matrix can also comprise an aluminosilicate, such as a metal aluminosilicate. For example, it can comprise calcium aluminosilicate, sodium calcium aluminosilicate, potassium calcium aluminosilicate, sodium magnesium aluminosilicate, or combinations thereof.

The matrix can also comprise a hydroxyapatite, such as a metal hydroxyapatite. For example, it can comprise calcium carbonate, calcium nitrate tetrahydrate, calcium hydroxide, or combinations thereof.

The matrix can further comprise an inert fill material, in addition to any of the materials mentioned above and others. An inert fill material can be any material that is incorporated into the solid matrix to fill the pores and does not significantly react with the infiltrating species for chemical bonding. For example, the inert material can be wood, aggregates, plastic, glass, metal, ceramic, ash, or combinations thereof.

In the case of powder, the powder can be characterized by a mean particle size, which can range from about 0.005 μm to 500 μm, such as from about 0.01 μm to about 100 μm, by particle size distribution and by specific surface area. A fine mean particle size and a narrow particle size distribution can be desirable for enhanced dissolution. The powder can be formed into a green body of any desired shape and size via any conventional technique, including extrusion, injection molding, die pressing, isostatic pressing, and slip casting. Ceramic thin films can also be formed. Any lubricants, and/or binders of similar materials used in shaping the compact can be used and should have no deleterious effect on the resulting materials. Such materials are preferably of the type that evaporate or burn out on heating at relatively low temperatures, preferably below 500° C., leaving no significant residue.

The matrix can comprise, for example, a mineral, industrial waste, or an industrial chemical material. A mineral can be, for example, a mineral silicate, iron ore, periclase, or gypsum. Industrial waste can be, for example, iron (II) hydroxide, fly ash, bottom ash, slag, glass, oil shells, red mud, battery waste, recycled concrete, mine tailings, paper ash, or salts from concentrated reverse osmosis brine. An industrial chemical can be any chemical synthesized or prepared by a factory or an industry in general.

The reactant material for the matrix can be any of those described previously. Further, the reactant in the matrix can be formed from a precursor of a reactant. For example, the reactant can be formed by reacting a reactant precursor with another agent, such as a basic solution. The basic solution can comprise, for example a hydroxide, such as a metal hydroxide. In one embodiment, the solid matrix can be prepared at least in part by the heat that is generated by the hot gas generated by a municipal solid waste decomposition facility.

The matrix can be formed into the shape and the dimensions of a product (the monolithic dense bodies) of a predetermined shape and size. The shape of the product can be retained from that of the solid matrix. In one embodiment, when the molar volume of the product is greater than that of the oxide powder (i.e., a positive molar volume change—i.e., transformation to a larger molar volume), the nucleated product fills the voids of the compact and increases its density. The molar volume change need not be positive; it can also be negative (i.e., transformation to a smaller molar volume) or no change depending on the ion species and reaction mechanism. For example, a portion of the matrix can dissolve away during the reaction, increasing porosity while creating new chemical bonding and a negative molar volume change. Similarly, if the new material form has the same volume as that from the loss of the matrix, then there is substantially no molar volume change. In either case, the reaction of the matrix creates a bonded network of reaction product and thus a mechanically stable structure.

HLPS reaction can occur via, for example, ion addition, and/or ion substitution. Ion addition reactions take place when ions (anions or cations) in the infiltrating medium can be added to the matrix host without substituting another ion in the matrix. Examples of an ion addition can include transformation from oxide to hydroxide, or from oxide to carbonate. Examples of an ion substitution can include transformation from hydroxide to carbonate, or hydroxide to oxalate. Additionally, the reaction can occur via disproportionation, wherein the insoluble inorganic host/matrix material can be split into two insoluble inorganic products. Disproportionation can be performed, for example, for oxides, fluorides, hydroxides, sulfates, mixed metal oxides, silicates, hydroxyapatites.

Heterogeneous or homogenous nucleation can also take place during the reaction. As described previously, the change in density can depend on the type of the matrix material and/or that of the product formed. Once the hydrothermal reaction is completed, the open pores can be further removed by, for example, aging. After the reactions as described above are completed, the densified monolithic matrix may be rinsed or bathed in a solution to wash away excess infiltrating solution. The rinsing solution can be any suitable solution, such as, for example, ammonium acetate at pH 5. In one embodiment, the densified matrix may be subsequently dried in an oven at a temperature of about room temperature to about 300° C., such as about at 90 to 250° C. The residual porosity that may be present in the sintered ceramic can be further removed by heating to a higher temperature, such as between 500° C. and 700° C., such as about 600° C.

The product sintered by the HLPS process can be in the form of a ceramic. Such a ceramic can have a variety of applications. For example, it can be used as a structural, chemical (e.g., catalyst, filtration), electronic component, semiconductor material, electrical material, or combinations thereof. Alternatively, the product produced can be a composition that has certain properties that allow it to be used as a (part of a) pharmaceutical composition or that comprises such a composition.

HLPS can produce a sintered product with a very homogeneous and very fine microstructure. The porosity of the sintered material can be, for example, less than about 15 percent, such as less than about 10 percent, such as less than about 5 percent, or even practically be fully dense. The total porosity of the compact can be determined by a standard technique, for example, with a mercury porosimeter. Density can be estimated using a conventional technique such as Archimedes' method or helium pycnometry.

One characteristic of the sintered material undergoing the HLPS process is that it can have the same shape, or even size, as the starting green compact. In one embodiment wherein the product undergoes substantially no molar volume change, no shrinkage of the compact may result, which is in contrast to many ceramic manufacturing processes, and thus little or no machining of the sintered material is needed.

A broad range of chemical compositions can be used to make the sintered material. Furthermore, the number of different metal oxides and salts involved in the formation of the sintered material need not be restricted in any particular way. In addition, the stoichiometry of the final product can be dictated by the molar ratios of reactants present in the green compact and infiltrating medium. The composition of the sintered material can be evaluated using Quantitative X Ray Diffraction (QXRD) and Inductively Coupled Plasma (ICP) spectroscopy.

The product of the HLPS process can have a microstructure that substantially resembles a web-like interconnecting network. The monoliths obtained from the HLPS process can also exhibit composite structures such as a core-shell structure. In addition, the product can have superior mechanical properties, such as high tensile strength, compressive strength, and desirable tensile modulus. This strengthening can arise from the chemical bonding formed during the process between the physically bonded particles by ion substitution, ion addition, Ostwald ripening (i.e., recrystallization that can form new network), or combinations thereof. In one embodiment, Ostwald ripening can involve aging a carbonate material in an alkaline medium. Furthermore, in the case where there is a positive molar volume change, densification can be achieved, as described previously.

Instead of making ceramics using high temperature processes, HLPS can provide an alternative method to form a variety of ceramic materials of interest in a fluid at mild temperature and/or pressure conditions. The ceramic can be of any type. For example, it can comprise crystalline inorganic materials, amorphous inorganic materials, conventional ceramics, or combinations thereof. The crystalline inorganic materials can comprise, for example, nonmetals, such as carbon nitride, metallic and nonmetallic species, such as quartz, titanium nitride, yttria, calcium fluoride, or a combination thereof. The amorphous inorganic materials can comprise, for example, nonmetals, such as amorphous carbon, or metallic and nonmetallic species, such as silica, zirconium-lanthanum, aluminum-sodium-fluoride, silicon oxynitride, or combinations thereof.

The ceramic crystals can be made without using "corrective" milling processes as in a conventional procedure and can have crystal sizes and morphology with suitable reactivity for making materials. Furthermore, the chemical bonds of the product produced by HLPS can be ceramic bonds substantially free of hydraulic bonds. Conventional cements have hydraulic bonding, and as a result, can degrade with respect to their mechanical strength, starting at about 200° C. —they can lose almost all of their strength at 1000° C. By substantially minimizing formation of hydraulic bonding (that is, bonding involving water molecules or portions thereof), the ceramic produced by HLPS can withstand temperatures of at least about 400° C., 500° C., 600° C., 700° C., 800° C., 900° C., or 1000° C. depending upon the reaction product that forms in the matrix.

The hydraulic-free bonds may include various different types of bonds that may be found in ceramics. For example non-hydraulic bonds may include hydrogen bonds, such as between a fluoride ion and a hydroxyl group, or between a phosphate group and a hydroxyl group. Non-hydraulic bonds may also include ionic bonds, covalent bonds, bonds that have partially ionic and covalent character, or bonds that have a covalent and/or metallic character such as for example the bonding found in ceramics like titanium diboride, $TiB_2$.

The present invention overcomes the drawback of relying on water for cement hardening in traditional processes. Instead, carbon dioxide provides the driving force for hardening. Other benefits of using HLPS to produce cement, or ceramic in general, can include shorter reaction time to form a ceramic product at low temperature and low pressure. Hydrothermal reactions can be conducted at temperatures typically less than about 400° C., such as less than 300° C., such as less than 200° C., such as less than 150° C., such as less than 100° C., such as less than 50° C., or at about room temperature. Hydrothermal reactions can be conducted at normal atmosphere pressure, or a slightly higher pressure, such as less than 2 atm, such as less than 3 atm, such as less 4 atm, such as less 5 atm, such as less 6 atm, such as less 7 atm, such as less 8 atm, such as less 9 atm, such as less 10 atm.

The ceramic produced can also be highly dense with minimal consumption of water and substantially no hydraulic bonds and mostly ceramic bonds. For example, the bonds in cements can be created by hydration of the powders when mixed in water. Conventional ceramics have most of their bonds created by diffusion induced by high temperature firing. By contrast, the ceramics of HLPS can be formed by reacting a monolithic compact of powder or solid matrix with an infiltrating medium to fill the interstitial spaces (i.e., pores) of the particles. The crystals nucleating and growing in these interstitial spaces can form chemical bonds to one another and to the powder matrix to create a ceramic-bonded monolithic body. As a result, unlike a hydraulic cementation processes, anhydrous ceramic bonds can be formed, whose stability can be at least about 1000° C., such as about 2000° C. Furthermore, unlike a conventional densification process (e.g., solid state sintering), the reaction temperature can be lower than about 90° C., such as 50° C., such as room temperature. Alternatively, it might be desirable to grow crystals in the interstitial spaces that homogenously nucleate so that adjacent crystals possess only physical Van der Waals forces.

HLPS can provide a method to form ceramic bonds with a variety of materials, including those that cannot be prepared by any conventional process. Accordingly, ceramic such as marble, a naturally occurring calcium carbonate ($CaCO_3$), can be synthesized from non-carbonated calcium sources.

Figure 2:
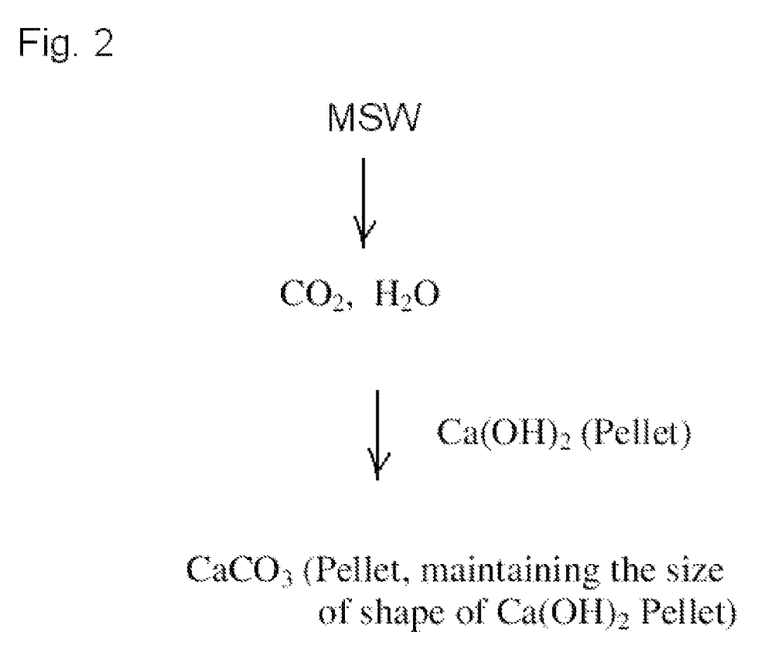
FIG. 2 shows a process of preparing a ceramic composition containing $CaCO_3$ from a carbon dioxide-water vapor mixture generated from a municipal solid waste.

FIG. 2 shows a process of preparing a ceramic composition containing $CaCO_3$ from a carbon dioxide-water vapor mixture generated from a municipal solid waste. The municipal solid waste is decomposed to generate a carbon dioxide-water vapor mixture. The carbon dioxide-water vapor mixture contacts $Ca(OH)_2$ pellets to form new pellets (the ceramic composition) that are mechanically stable and maintain the shape and size of the $Ca(OH)_2$ pellets. XRD analysis shows that the new pellets contain $CaCO_3$.

Figure 3:
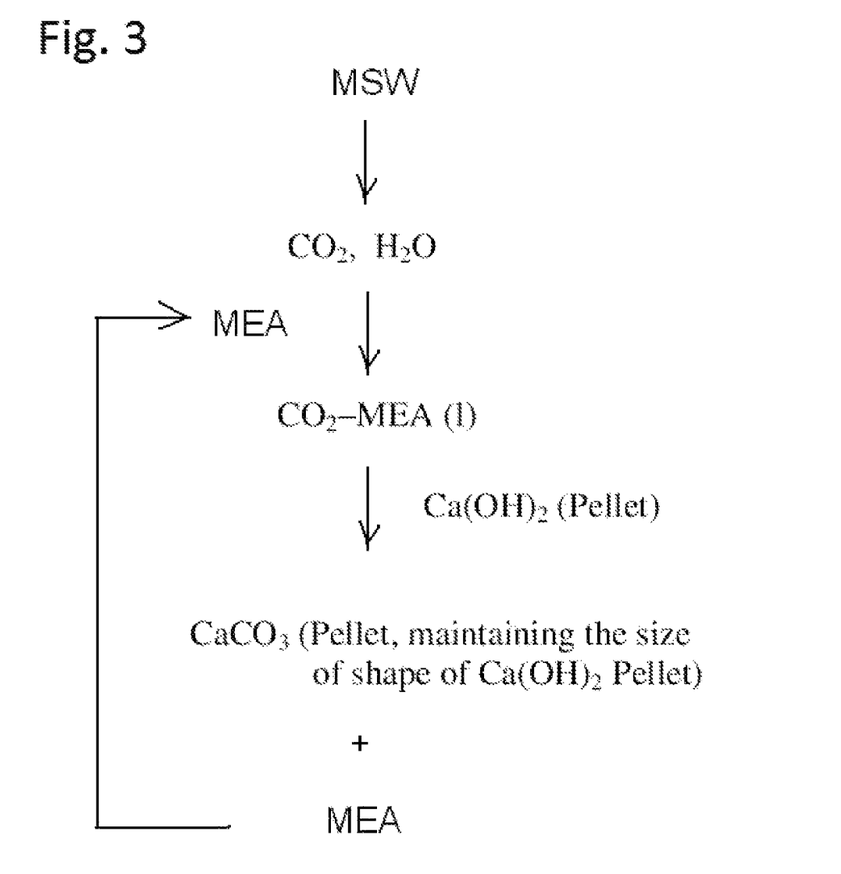
FIG. 3 shows a process of preparing a ceramic composition containing $CaCO_3$ from a carbon dioxide-water vapor mixture generated from a municipal solid waste with a gas absorber (MEA).

FIG. 3 shows a process of preparing a ceramic composition containing $CaCO_3$ from a carbon dioxide-water vapor mixture generated from a municipal solid waste with a gas absorber (monoethanolamine, MEA). The municipal solid waste is decomposed to generate a carbon dioxide-water vapor mixture. The carbon dioxide-water vapor mixture contacts MEA to form an adduct —$CO_2$-MEA. $CO_2$-MEA then contacts $Ca(OH)_2$ pellets to form new pellets (the ceramic composition) that are mechanically stable and maintain the shape and size of the $Ca(OH)_2$ pellets. XRD analysis shows that the new pellets contain $CaCO_3$.

Figure 4:
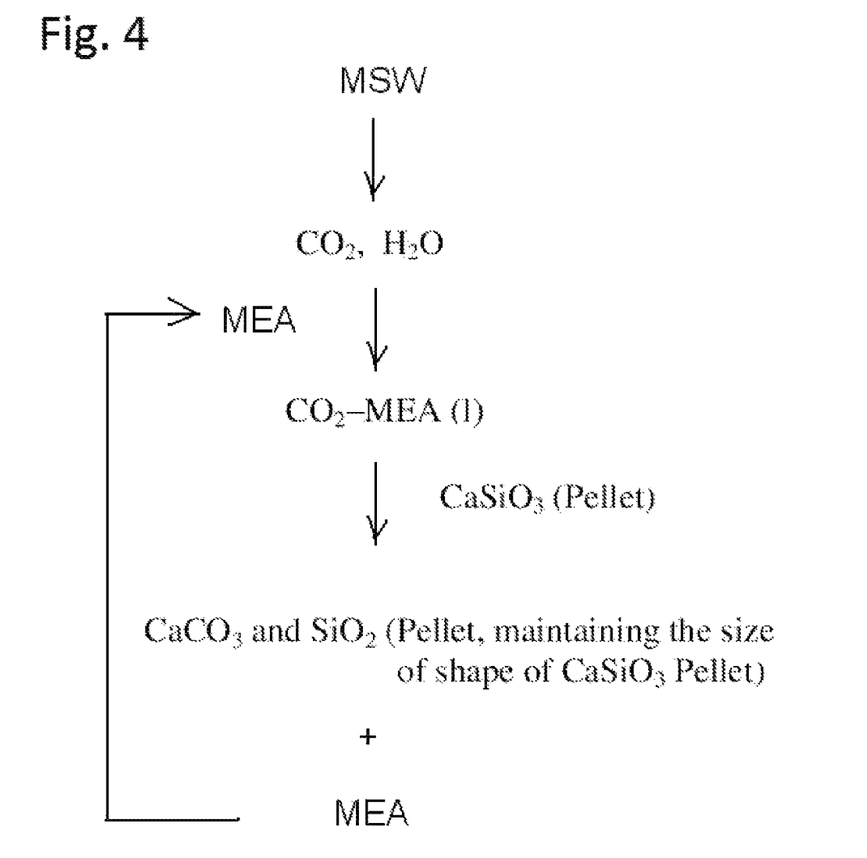
FIG. 4 shows a process of preparing a ceramic composition containing $CaCO_3$ and $SiO_2$ from a carbon dioxide-water vapor mixture generated from a municipal solid waste with a gas absorber (MEA).

FIG. 4 shows a process of preparing a ceramic composition containing $CaCO_3$ and $SiO_2$ from a carbon dioxide-water vapor mixture generated from a municipal solid waste with a gas absorber (MEA). The municipal solid waste is decomposed to generate a carbon dioxide-water vapor mixture. The carbon dioxide-water vapor mixture contacts MEA to form an adduct —$CO_2$-MEA. $CO_2$-MEA then contacts $CaSiO_3$ pellets to form new pellets (the ceramic composition) that are mechanically stable and maintain the shape and size of the $CaSiO_3$ pellets. XRD analysis shows that the new pellets contain $CaCO_3$ and $SiO_2$.

In an HLPS process, the transport of water or an alternative solvent in the matrix structure controls the uniformity and final density of the ceramic composition. Liquid water slows the diffusion of $CO_2$ when liquid water fills vacant pores in the matrix because the gaseous $CO_2$ must diffuse through extensive regions of liquid water to get to a reactive site or to regions where water partially fills pores. The uniformity is of great importance when preparing large structure ceramic compositions. The present invention provides a system that utilizes the diffusion of the carbon dioxide-water vapor mixture that diffuses through and to deliquescent solid-containing pores in the matrix to create deliquescent liquids saturated with soluble carbon dioxide. Such transport strategies enable the formation of large structures that would not be possible with the transport of water liquid and gaseous $CO_2$.

The carbon dioxide-water vapor mixture generated in the municipal solid waste decomposition facility can be supplied to a matrix pre-mixed with a deliquescent solid. The matrix has contiguous interstitial pores, and the deliquescent solid can be placed in these pores. When the carbon dioxide-water vapor mixture contacts the matrix, an aqueous liquid phase infiltrating medium is generated in the interstitial space in the matrix, and the carbon dioxide is dissolved in the infiltrating medium. The carbon dioxide in the infiltrating medium then reacts with a reactant of the matrix, the reaction forming a product, thereby producing the ceramic composition.

As defined herein, deliquescent solids are substances (e.g., salts) that have a strong affinity for moisture and will absorb a large amount of water, forming a liquid solution. Examples of deliquescent solids include lithium nitrate, magnesium nitrate, lithium chloride, calcium chloride, sodium chloride, magnesium chloride, zinc chloride, ammonium carbonate, lithium carbonate, sodium carbonate, potassium carbonate, potassium phosphate, carnallite, ferric ammonium citrate, lithium hydroxide, potassium hydroxide, sodium hydroxide, and other salts that are hygroscopic.

Selection of the deliquescent solid relies on the level of humidity in the carbon dioxide-water vapor mixture. Some salts can operate at very low relative humidity. For example, $Mg(NO_3)_2$ can form liquid solutions at low water activities of (0.05-1.0% RH). At equilibrium, moist air can transform $Mg(NO_3)_2$ into a solution when the mole fraction of Mg-salt is 0.35 in water solution. Assuming the temperature is room temperature and the RH is 50% and the porous matrix component is 1 cubic foot, the pores of the matrix can be partially filled by 50% (DPS=50%) by volume with a solution that has a final composition of 0.35 $Mg(NO_3)_2$ and 0.65 $H_2O$ (the rule of mixtures is used to estimate the solution density). Assuming the porosity is 40% and the pores are monodisperse, moist air will enter the structure and gradually the $Mg(NO_3)_2$ salt in the pores will liquefy when this composition is selected.

First, pick the weight percent of Mg-nitrate to correspond to value at 50% of the pore volume, and a solution that contains 0.35 mol fraction of Mg-nitrate (use the rule of mixtures to estimate the density of the solution). Psychrometric calculations indicate that an airflow rate of 10.4 $m^3/h$ in 3 h can deliver enough water to make an aqueous solution with a final mole fraction of 0.35 $Mg(NO_3)_2$ in water. At that point, more gas flow can continue to dilute the magnesium salt concentration and increase the DPS value (DPS, degree of pore saturation, as defined by J. Reed (Principles of Ceramic Processing, John Wiley and Sons, 1991)) beyond 50%.

Such an option can be useful for control of the reaction rate and fraction of porous matrix reacted (amount of product formed). Alternatively, the relative humidity can be dropped to 1% or less and the solution volume in the pore will be fixed since this solution composition can be adjusted so that it will equilibrate with a low humidity gas stream (e.g., a solution composition that can form an azeotrope or eutectic liquid). Thus, this example shows how to avoid the use of liquid water by delivering it in a gas phase and condensing it in a pore by using a deliquescent solid. It also shows how to precisely control the volume of fluid in each pore without having capillary forces creating a gradient in solution composition because the liquid phase will form uniformly in the bulk pore phase as the magnesium salt slowly traps more and more water vapor (desiccates) in the pore. A similar computation can be done at elevated temperatures such as 60° C. or 90° C. where the triggering composition for deliquescence can be computed, as well as the volume of the infiltrating solution and moisture carrying capacity of the air being used.

Other salts can be used, such as $CaCl_2$ or even NaCl. These salts require higher relative humidity to activate solution formation than $Mg(NO_3)_2$. NaCl requires a relative humidity of 75% and $CaCl_2$ solutions require a minimum relative humidity of 20%. These specific salts are also more limited in solution composition since they form insoluble compounds, such as $CaCl_2.2H_2O$ or NaCl.

The deliquescent solid (salt) additive can be co-processed where the salt serves a dual role as the binder phase for a casting slip. For example, during the casting process, the salt can be dissolved in water to impart favorable mechanical properties such as tensile strength to the porous matrix during the drying step, which is when porous matrices frequently crack. Other dual ever more multiple roles can be conceived for such a salt additive. During drying the salt can precipitate on the particle surfaces. Alternatively, in some embodiments, the deliquescent salt can be incorporated into a vehicle such as vermiculite, whose porosity can accommodate both water and the deliquescent salt. This compound can be a relatively insoluble phase until a specific temperature where relative humidity activates the system to liquefy and expand, creating an abundance of solution for $CO_2$ absorption and ionization.

Alternatively, the deliquescent salt can be processed in anhydrous conditions and co-granulated with the binder components of the porous matrix that can be dry mixed with other components such as aggregate or sand. The mixture can be dry compacted in the porous matrix (ceramic green body) and the mixture can form solutions in the pores via changes in relative humidity and temperature.

Another major advantage of deliquescent salts is the type of the salt added and selected relative humidity determines the time and volume of solution formed at the onset of liquefaction. This is because the volume of solution is determined by the equilibrium composition of the salt solution. At a water activity of 0.05 or relative humidity of 5%, $Mg(NO_3)_2$ will form a liquid. Other salts, such as NaCl, do not liquefy until they reach a composition corresponding to 35 mol % NaCl.

Figure 5:
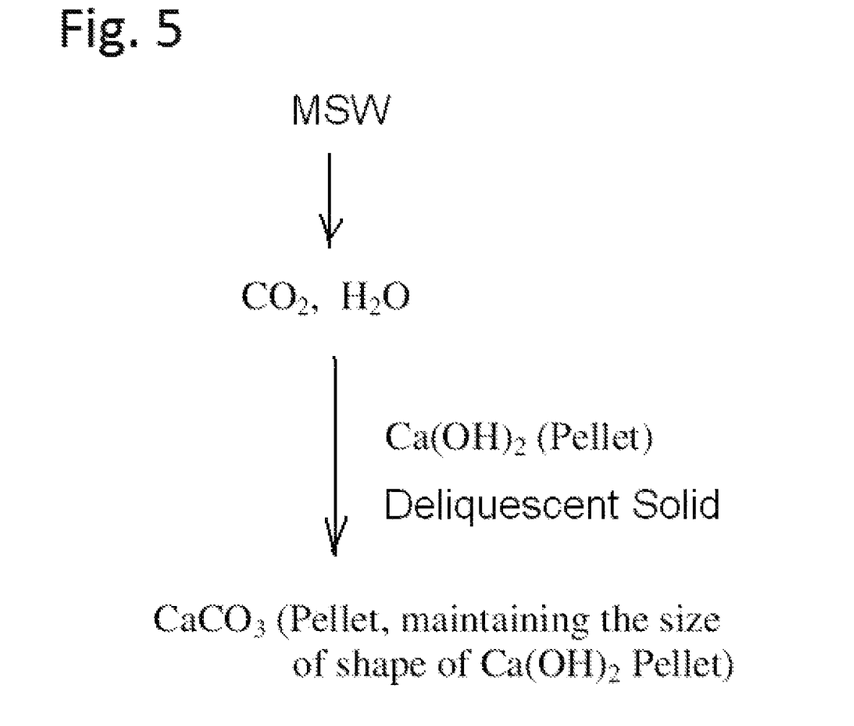
FIG. 5 shows a process of preparing a ceramic composition containing $CaCO_3$ from a carbon dioxide-water vapor mixture generated from a municipal solid waste with a deliquescent solid.

FIG. 5 shows a process of preparing a ceramic composition containing $CaCO_3$ from a carbon dioxide-water vapor mixture generated from a municipal solid waste with a deliquescent solid. The municipal solid waste is decomposed to generate a carbon dioxide-water vapor mixture. $Ca(OH)_2$ pellets are premixed with a deliquescent solid $(Mg(NO_3)_2)$. The carbon dioxide-water vapor mixture contacts the premixed $Ca(OH)_2$ pellets to form new pellets (the ceramic composition) that are mechanically stable and maintain the shape and size of the premixed Ca(OH)$_2$ pellets. XRD analysis shows that the new pellets contain CaCO$_3$.

Figure 6:
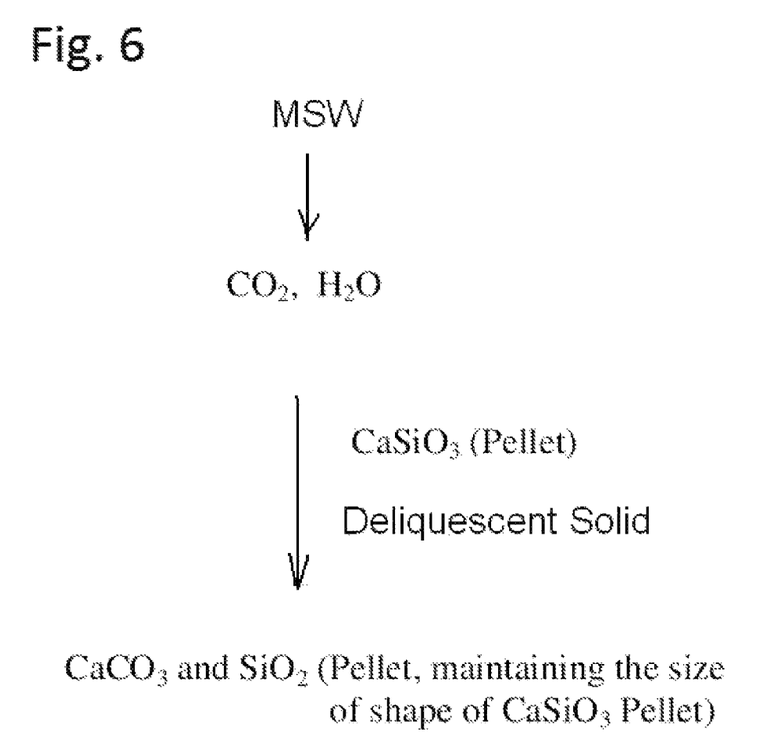
FIG. 6 shows a process of preparing a ceramic composition containing $CaCO_3$ and $SiO_2$ from a carbon dioxide-water vapor mixture generated from a municipal solid waste with a deliquescent solid.

FIG. 6 shows a process of preparing a ceramic composition containing CaCO$_3$ and SiO$_2$ from a carbon dioxide-water vapor mixture generated from a municipal solid waste with a deliquescent solid. The municipal solid waste is decomposed to generate a carbon dioxide-water vapor mixture. CaSiO$_3$ pellets are premixed with a deliquescent solid (Mg(NO$_3$)$_2$). The carbon dioxide-water vapor mixture contacts the premixed CaSiO$_3$ pellets to form new pellets (the ceramic composition) that are mechanically stable and maintain the shape and size of the premixed CaSiO$_3$ pellets. XRD analysis shows that the new pellets contain CaCO$_3$ and SiO$_2$.

Figure 7:
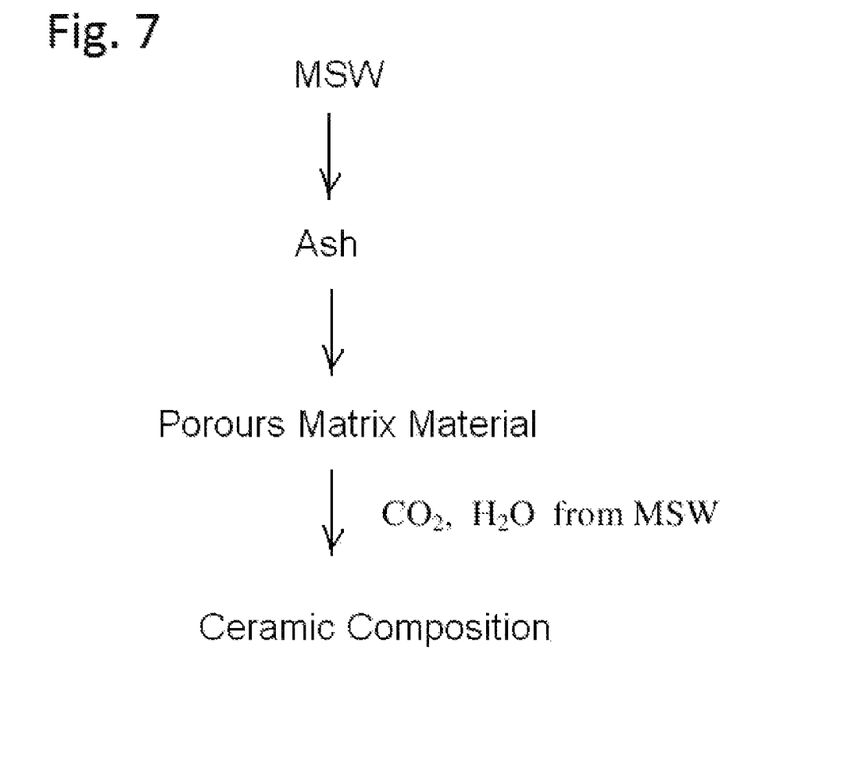
FIG. 7 shows a process of preparing a porous matrix material from ash generated from a municipal solid waste and preparing a ceramic composition from the porous matrix material.

In the municipal solid waste decomposition process, ash is generated. Ash includes inorganic materials, such as, salts and metal oxides. The ash can be collected and used to prepare the matrix. FIG. 7 shows a process of preparing a porous matrix material from ash generated from a municipal solid waste and preparing a ceramic composition from the porous matrix material. The porous matrix material thus prepared can be used as the matrix for the HLPS process.

An advantage to this invention is the use of waste enables the portable generation of large amounts of recipe components because the apparatus can be small enough to be brought to a construction site for making cast-in-place carbonate concrete. More importantly, the source of waste can always be available at distances less than a few miles in quantities that are substantial enough to supply large construction projects. Another advantage of this invention is the utility it imparts to areas of the world affected by devastating storms and other types of tragedies of large magnitude, such as earth quakes or volcanic eruptions as well as military bases established in remote regions of the world where there is no supply chain for recipe components, inorganic components and/or energy. In these cases, building debris (wood, plastic, paper, etc.) and other remains can be used to make the recipe components to complement the inorganic components that comprise the concrete, such as but not limited to recycled Portland cement, sand and aggregate. This portability is essential for disaster areas where poor access due to infrastructure failure inhibits the delivery of building products. In this case, reconstruction of towns and cities can rely on the use of indigenous materials. Even when raw materials, such as CO$_2$ and water, are available, the use of the municipal solid waste forgoes the need for the use of pressurized and refrigerated tankards for CO$_2$ or access to public portable or non-portable water supplies.

In connection with the above described methods, there is provided a system for preparing a ceramic composition while simultaneously reducing the quantity of carbon dioxide from municipal solid waste that would discharge into environment. The system includes (a) a municipal solid waste treatment unit that generates a gas-water vapor mixture; (b) a reaction unit containing a matrix; and (c) a delivery path between the treatment unit and the reaction unit. The scope, composition and manipulation of various components including municipal solid waste, gas-water vapor mixture, gas absorber, delivery path, and matrix are as described above.

Another aspect of the invention provides a ceramic composition produced according to the methods described herein. By modifying the precursors (e.g. matrix reactants, deliquescent solid, and gas absorber) and the reaction condition, compositions of different characteristics can be produced.

NON-LIMITING WORKING EXAMPLES

Example 1: Generation of Carbon Dioxide-Water Vapor Mixture

The municipal solid waste including 10 tons of wood, cardboard, and paper can be gasified in a decomposition facility. The gasification can produce a carbon dioxide-water vapor mixture that includes about 3,000 kg of carbon dioxide and 600 kg of water. The carbon dioxide-water vapor mixture can be cooled down to form a CO$_2$-saturated water solution.

Example 2: Precipitation of Metal Carbonates

The carbon dioxide-water vapor mixture generated from the municipal solid waste decomposition facility in Example 1 can be passed through a monoethanolamine (MEA) solution to form a CO$_2$-absorbed MEA aqueous solution (MEA-CO$_2$). Then MEA-CO$_2$ can react with an alkaline-earth metal hydroxide, such as Ca(OH)$_2$ or Mg(OH)$_2$, to produce carbonates and regenerate MEA with a low energy demand and a fast reaction rate. The first process could be described as follows:

Step 1): Formation of alkaline earth metal hydroxide from the caustic aqueous solution $$2MOH + M'M_x''O_y(s) = M'(OH)_2(s) + M_2M_x''O_y(l), \quad (1\text{-}1)$$

$$2MOH + M'M_x''O_y(s) = M'(OH)_2(s) + M_2M_x''O_y(s), \quad (1\text{-}2)$$

wherein, MOH (M is an alkali metal) is a caustic solid or solution (e.g., NaOH, KOH or any waste caustic solid/solution from the industry); M'M$_x$''O$_y$ (M' is an alkali earth metal) can be alkaline earth metal-oxide bearing materials, such as sulfate, silicate, and aluminosilicate minerals or industrial waste product (e.g., gypsum (CaSO$_4$), wollastonite (CaSiO$_3$), olivine (Mg$_2$SiO$_4$), anorthite (CaAl$_2$Si$_2$O$_8$), or combinations thereof). The product of M$_2$M$_x$''O$_y$ can be either soluble or insoluble in the water.

Step 2): Formation of alkaline earth metal carbonates and regeneration of MEA $$MEA\text{-}CO_2(l) + 2M'(OH)_2(s) = M'CO_3(s) + MEA(l) \quad (2\text{-}1)$$

$$MEA\text{-}CO_2(l) + 2M'(OH)_2(s) + M_2M_x''O_y(s) = M'CO_3(s) + MEA(l) + M_2M_x''O_y(s) \quad (2\text{-}2)$$

If the produced M$_2$M$_x$''O$_y$ is dissolved in the solution (reaction (1-1)), an additional separation process can be used to recover M'(OH)$_2$ solid, which is used for the carbonation step (see reaction (2-1)). If the produced M$_2$M$_x$''O$_y$ is a solid (see reaction (1-2)), this solid likely would not affect the reaction of MEA-CO$_2$ and M'(OH)$_2$. At the end of the reaction, only MEA solution is liquid phase, along with the carbonate solid and M$_2$M$_x$''O$_y$ solid (see reaction (2-2)).

Both carbonation reaction (2-1) and (2-2) can be instantaneous reactions under ambient condition with mild agitation. Thus, fixation of CO$_2$ and regeneration of amine can be time and energy efficient processes.

Example 3: HLPS Ca(OH)$_2$ Pellet

About 10 g Ca(OH)$_2$ was mixed with 10 g de-ionized water to form a slurry. The slurry was then shaken and poured into a 1" diameter stainless steel die. A load of 6 tons was applied on the die slowly. The pressed Ca(OH)$_2$ pellets were dried at 95° C. for 1 day. The dried pellets were placed in the CO$_2$-saturated 20 wt % MEA solution (can be prepared in the same way as in Example 2) at room temperature for 1 day. After 1 day reaction, the pellets were dried at 60° C. for 4 hours, then 95° C. for overnight. The dried pellets were placed into the $CO_2$-saturated 20 wt % MEA solution at room temperature for another 1 day reaction. The pellets were then taken out and thoroughly rinsed with de-ionized water. The pellet was dried in the oven at 60° C. for 4 hours, then 95° C. overnight. XRD analysis revealed the pellet comprised >50% $CaCO_3$ (calcite). The sample maintained its shape and size and did not change its dimensions after HLPS. The material was mechanically stable.

Example 4: HLPS Wollastonite ($CaSiO_3$) Pellets

About 35 g $CaSiO_3$ was mixed with 35 g de-ionized water. The slurry was then shaken and poured into a 1" diameter stainless steel die. A load of 6 tons was applied on the die slowly. The pressed $CaSiO_3$ pellets were placed in the $CO_2$-saturated 30 wt % MEA solution (can be prepared in the same way as in Example 2) at 60° C. for 3 days. After 3 day reaction, the pellets were dried in the oven at 95° C. for overnight. The dried pellets were then placed in the $CO_2$-saturated 30 wt % MEA solution at 60° C. for another 2 day reaction. After 2 days, the pellets were dried as described above, and then placed in the $CO_2$-saturated 30 wt % MEA solution at 60° C. for 2 days. Subsequently, the pellets were dried as described above. The total reaction time was 7 days. XRD analysis revealed the pellet comprised $CaCO_3$ patterns (calcite and aragonite polymorphs). The sample maintained its shape and size and did not change its dimensions after HLPS. The material was mechanically stable.

Example 5: HLPS Diopside Bricks

About 500 kg Diopside ($MgCaSi_2O_6$) can be combined with 1 mm diameter media in a large attrition mill for 6 hours and ground into a powder to a particle size distribution of 1-5 µm. The powder can be mixed with 500 kg de-ionized water to form a slurry. The slurry can then be poured into a brick-casting die. A load of 7 tons can be applied on the dies slowly to form pressed $MgCaSi_2O_6$ bricks, which can be dried at 90° C. for 1 day.

The dried bricks can be placed in a $CO_2$-saturated water solution (prepared according to Example 1) under a sealed tent at 40 psig, at 130° C., for 72 hours. After three days reaction, the bricks can be dried at 95° C. overnight. XRD analysis can reveal that the brick comprises of $MgCO_3$ and $CaCO_3$ patterns. The product can maintain its shape and size and do not change its dimensions after HLPS, and can be mechanically stable.

It will be appreciated by persons skilled in the art that the present invention is not limited to what has been particularly shown and described. Rather, the scope of the present invention is defined by the claims which follow. It should further be understood that the above description is only representative of illustrative examples of embodiments. The description has not attempted to exhaustively enumerate all possible variations. The alternate embodiments may not have been presented for a specific portion of the invention, and may result from a different combination of described portions, or that other un-described alternate embodiments may be available for a portion, is not to be considered a disclaimer of those alternate embodiments. It will be appreciated that many of those un-described embodiments are within the literal scope of the following claims, and others are equivalent.

What is claimed:

1. A method for preparing a ceramic composition while simultaneously reducing the quantity of carbon dioxide from municipal solid waste that would discharge into environment comprising:
   (a) decomposing the municipal solid waste to generate a gas-water vapor mixture consisting essentially of carbon dioxide and water and providing energy for preparing the ceramic composition;
   (b) providing a matrix comprising a reactant consisting essentially of species that react with carbon dioxide to form a product; and
   (c) contacting said carbon dioxide with said matrix to promote a reaction between said carbon dioxide and said reactant of the matrix.

2. The method of claim 1 further comprising:
   prior to step (c), contacting said gas-water vapor mixture with a gas absorber to form a carbon dioxide-gas absorber mixture comprising said carbon dioxide.

3. The method of claim 2, wherein the gas absorber comprises a nitrogen-containing compound.

4. The method of claim 3, wherein the nitrogen-containing compound is selected from the group consisting of ammonia, alkanolamines, polyamines of a mixed or single type, cyclic and aromatic amines, aminoacids, sterically free and hindered amines, monoethanolamine (MEA), diethanolamine (DEA), ethyldiethanolamine, methyldiethanolamine (MDEA), 2-amino-2-methyl-1-propanol (AMP), 3-piperidino-1.2-propanediol, 3-quinuclidinol, 2-piperidineethanol, 2-piperidinemethanol, N,N-dimethylethanolamine, 2-amino-2 methyl-1,3 propanediol, diisopropanolamine, piperazine, and a mixture thereof.

5. The method of claim 3, wherein the gas absorber further comprises an organic or inorganic base.

6. The method of claim 3, wherein the gas absorber further comprises a water-soluble salt.

7. The method of claim 1, wherein the reactant comprises one or more compounds selected from the group consisting of a metal oxide, a metal hydroxide, a metal halide, a mixed metal oxide, a metal sulfate, a metal silicate, a metal hydroxyapatite, a combination thereof.

8. The method of claim 7, wherein the one or more compounds comprise a metal selected from the group consisting of a Group IIa metal, a Group IIb metal, a Group IIIb metal, a Group IVb metal, a Group Vb metal, a lanthanide metal, and an actinide metal.

9. The method of claim 1, wherein the matrix further comprises a deliquescent solid premixed with the reactant, said deliquescent solid forming an aqueous phase after contacting with said gas-water vapor mixture.

10. The method of claim 9, wherein said deliquescent solid comprises one or more compounds selected from the group consisting of lithium nitrate, magnesium nitrate, lithium chloride, calcium chloride, sodium chloride, magnesium chloride, zinc chloride, ammonium carbonate, lithium carbonate, sodium carbonate, potassium carbonate, potassium phosphate, carnallite, ferric ammonium citrate, lithium hydroxide, potassium hydroxide, sodium hydroxide, and a combination thereof.

11. The method of claim 1, wherein the matrix further comprises ash generated from the decomposition of the municipal solid waste.

12. The method of claim 1, wherein more than about 20% of the matrix contains pores.

13. The method of claim 1, wherein the matrix further comprises an inert material selected from the group consisting of wood, aggregates, plastic, glass, metal, ceramic, ash, and a combination thereof.

14. The method of claim 1, wherein the ceramic composition has substantially the same shape as the matrix.

15. The method of claim 1, wherein the municipal solid waste is decomposed by incineration, micro auto gasification, hydrothermal destruction, or supercritical water oxidation.

16. The method of claim 1, wherein the temperature for the reaction between the carbon dioxide and the reactant ranges from about 80° C. to about 200° C.

17. The method of claim 1, wherein the pressure for the reaction between the carbon dioxide and the reactant ranges from about 1 to about 3 atmospheres.

18. A system for preparing a ceramic composition while simultaneously reducing the quantity of carbon dioxide from municipal solid waste that would discharge into environment comprising:
   a municipal solid waste treatment unit that generates a gas-water vapor mixture comprising carbon dioxide and provides energy for preparing the ceramic composition;
   a reaction unit comprising a matrix, said matrix comprising a reactant for reacting with the carbon dioxide; and
   a delivery path between the treatment unit and the reaction unit for delivering the gas-water vapor mixture.

19. The system of claim 18, wherein the delivery path comprises a gas absorber.

20. The system of claim 19, wherein said gas absorber comprises one or more compounds selected from the group consisting of ammonia, alkanolamines, polyamines of a mixed or single type, cyclic and aromatic amines, amino-acids, sterically free and hindered amines, monoethanolamine (MEA), diethanolamine (DEA), ethyldiethanolamine, methyldiethanolamine (MDEA), 2-amino-2-methyl-1-propanol (AMP), 3-piperidino-1.2-propanediol, 3-quinuclidinol, 2-piperidineethanol, 2-piperidinemethanol, N,N-dimethylethanolamine, 2-amino-2 methyl-1,3 propanediol, diisopropanolamine, piperazine, and a combination thereof.

21. The system of claim 18, wherein the reactant comprises one or more compounds selected from the group consisting of a metal oxide, a metal hydroxide, a metal halide, a mixed metal oxide, a metal sulfate, a metal silicate, a metal hydroxyapatite, and a combination thereof.

22. The system of claim 18, wherein the matrix further comprises a deliquescent solid premixed with the reactant, said deliquescent solid forming an aqueous phase after contacting said gas-water vapor mixture.

23. The system of claim 22, wherein the deliquescent solid is selected from the group consisting of lithium nitrate, magnesium nitrate, lithium chloride, calcium chloride, sodium chloride, magnesium chloride, zinc chloride, ammonium carbonate, lithium carbonate, sodium carbonate, potassium carbonate, potassium phosphate, carnallite, ferric ammonium citrate, lithium hydroxide, potassium hydroxide, sodium hydroxide, and a combination thereof.

* * * * *